United States Patent [19]
Schendel

[11] Patent Number: 6,062,081
[45] Date of Patent: *May 16, 2000

[54] EXTENDED RANGE ACCELEROMETER

[75] Inventor: Robert E. Schendel, Kingwood, Tex.

[73] Assignee: Texas Components Corporation, Houston, Tex.

[ * ] Notice: This patent is subject to a terminal disclaimer.

[21] Appl. No.: 08/980,479

[22] Filed: Nov. 29, 1997

Related U.S. Application Data

[63] Continuation-in-part of application No. 08/764,263, Dec. 12, 1996, Pat. No. 5,756,896, which is a continuation of application No. 08/523,655, Sep. 5, 1995, abandoned.

[51] Int. Cl.[7] .................................................. G01P 15/08
[52] U.S. Cl. ................................. 73/514.08; 73/514.31
[58] Field of Search ........................ 73/514.08, 514.14, 73/514.16, 514.31, 514.39, 514.12, 514.05

[56] References Cited

U.S. PATENT DOCUMENTS

| | | | |
|---|---|---|---|
| 2,797,912 | 7/1957 | Trostler | 73/514.05 |
| 3,516,294 | 6/1970 | Schmieder | 73/514.08 |
| 4,043,204 | 8/1977 | Hunter et al. | 73/514.08 |
| 4,047,439 | 9/1977 | Russell et al. | 73/514.08 |
| 4,192,189 | 3/1980 | Presley | 73/514.08 |
| 4,845,988 | 7/1989 | Russell et al. | 73/514.08 |
| 4,901,571 | 2/1990 | Reinhardt | 73/514.31 |
| 4,905,517 | 3/1990 | Crowe et al. | 73/514.08 |
| 4,922,753 | 5/1990 | Idogaki et al. | 73/514.08 |
| 4,991,438 | 2/1991 | Evans | 73/514.08 |
| 5,040,418 | 8/1991 | Kushida et al. | 73/514.31 |
| 5,756,896 | 5/1998 | Schendel | 73/514.31 |

FOREIGN PATENT DOCUMENTS

| | | | |
|---|---|---|---|
| 63151864 | 6/1988 | Japan | G01P 15/11 |
| 63153472 | 6/1988 | Japan | G01P 15/11 |
| 466456 | 10/1995 | Russian Federation | G01P 15/08 |

*Primary Examiner*—Hezron Williams
*Assistant Examiner*—Helen C. Kwok
*Attorney, Agent, or Firm*—Larry Mason Lee

[57] ABSTRACT

A low noise, extended dynamic range accelerometer useful for sensitive seismic observations. The accelerometer's extended range is obtained by utilizing a single opposing magnetic field to non-linearly oppose movement of a magnetic proof mass. The accelerometer may also utilize an external bias magnetic field located apart from the magnetic proof mass to provide a constant gravitational offset source.

12 Claims, 2 Drawing Sheets

EXTENDED RANGE ACCELEROMETER

This application is a continuation-in-part of U.S. application Ser. No. 08/764,263, filed Dec. 12, 1996, now U.S. Pat. No. 5,756,896, which is a continuation of U.S. application Ser. No. 08/523,655, filed Sep. 5, 1995, now abandoned.

SUMMARY OF THE INVENTION a. Field of Invention

The present invention relates to the field of apparatus for and methods of measuring accelerations, particularly those accelerations in the range of interest for seismic movement measurements.

b. Background of the Invention

Schendel 08/523,655 discussed the prior art and the limitations of the prior art applicable to accelerometers useful for sensitive seismic observations. As discussed in Schendel 08/523,655, the prior art in the field of apparatus for and methods of measuring acceleration includes utilization of a proof mass suspended by one or more springs within a sensor housing such that the proof mass is limited in motion to motion along the central axis of the sensor housing by said springs such that the proof mass displacement along such central axis is opposed by the springs and the proof mass motion is measured by measuring the acceleration of the proof mass along such central axis.

As did Schendel 08/523,655, from which the instant invention is a Continuation-In-Part, additional prior art in the field of apparatus for and methods of measuring accelerations also includes utilization of a magnetic, or permeable, proof mass suspended in a ferro fluid within a sensor housing as the result of a magnetic field externally disposed to the sensor housing such that the movement and positioning of the magnetic proof mass within the sensor housing is controlled by and often measured by variations in such magnetic field strength. All of such apparatus utilize an external electromagnetic field to control and/or null the movement and/or positioning of the proof mass; these apparatus are limited in their sensitivity of measurement by the noise inherent in the electrical/electronic circuits driving and/or comprising the electromagnetic field generator.

Further, many of the apparatus and methods of measuring accelerations in the prior art attempt to linearize the relationship between the physical displacement of the proof mass within the sensor housing and the acceleration to be measured, either by physically limiting the range of motion of the proof mass or by varying the external magnetic field strength. Such attempts to linearize the relationship inherently have either an excessively limited range of usefulness and/or external noise generation in the positioning mechanism.

Trostler U.S. Pat. No. 2,797,912 uses a means to monitor movement of the proof mass that is structurally and functionally distinct from the two pickup signal coils claimed in the present invention, and thus does not anticipate the pickup signal coils in the present invention. Trostler detects displacement of the proof mass by utilizing the resistance of the electrolyte (ferro fluid) disposed between the proof mass and a set of two electrodes to affect the current flow in signal coils connected to the two electrodes.

Trostler's electrolyte resistance varies with respect to the distance between the proof mass and the subject electrodes. When Trostler's proof mass encroaches upon one electrode, that resistance path will decrease while the resistance between the proof mass and the other electrode will increase. Since, at rest, Trostler's acceleration detection circuit comprises a balanced resistance bridge (column 3, lines 45–50), when that balance is disturbed by proof mass movement current will flow to the signal transformer windings 23a (column 4, lines 15–20). The amplitude of this current is purported to represent the acceleration of the proof mass. Additionally, Trostler's output signal is wholly dependant upon an external excitation voltage. The external voltage energizes windings 18 and 19 which produce an electromagnetic field which returns the proof mass to its resting, null position after the proof mass is disturbed. This external voltage source also provides the current that flows to Trostler's signal transformer windings which ultimately is processed into readable acceleration data. In fact, Trostler's signal transformer winding is electrically a portion of the secondary winding of the input transformer.

As opposed to Trostler's varying resistance, induced current, and external excitation voltage, the instant invention utilizes magnetically induced current which further induces voltage in the the present invention's signal pickup coils. This induced voltage is produced by relative magnetic field movement between the signal pickup coils and the magnetic proof mass. No external electrical source is used, and use of an external electrical signal applied to the signal pickup coils of the instant invention is explicitly disclaimed.

Further, the instant invention's two signal pickup coils are wound in opposite directions and disposed in a proximity to detect movement of the proof mass. While Trostler's signal pickup transformer windings may indirectly experience electrical signals upon movement of the proof mass, neither of Trostler's windings produces electrical signals of opposing polarity to the other (unlike the instant invention). Since Trostler's electrodes are not in opposing polarity, any mechanical or electrical noise superimposed upon the electrodes will be transmitted throughout the system and produce inaccuracies in the acceleration measurement—a distinct disadvantage when compared to the present invention because such noise-related inaccuracies cannot occur in the instant invention. Any noise transmitted onto the coils of the present invention will inherently be of equal magnitude in each coil and since the coils are of opposing polarity the noise traversing the first coil will be 180° out of phase with the noise on the second coil. When the equal and opposite noise signals reach the end of their respective coil (the point where the coils are connected is the ground point), the signals will be 180° out of phase and will null to zero.

Finally, Trostler discloses and claims a means for suspending the proof mass inside the casing. The means are described as fiber-like elements connected to the proof mass and used to maintain the proof mass in a certain position. The instant invention does not require these additional suspension means. The instant invention's proof mass is maintained in place by the magnetic force field created between the passive external magnetic fields and the ferro fluid.

Trostler also disclosed an input amplifier and a software conversion means; however, as opposed to the instant invention, the software conversion means used by Trostler does not process a non-linear input into a linear output, and this is another aspect by which the instant invention contrasts with Trostler. The instant application provides a system whereby the output signal of the pickup coils is non-linear with respect to the acceleration of the magnetic proof mass. Conversely, Trostler explicitly teaches a system which uses the application of external voltage for dampening the proof mass to produce a "linear" output signal (column 4, lines 50–55). The instant invention also eliminates the need for application of an external voltage to produce dampening since it can process nonlinear acceleration data into a processed, linear output. Moreover, the instant invention employs a high impedance, voltage controlled system to measure proof mass acceleration. This is unlike, and never suggested by, Trostler who teaches adding excitation voltage to the pickup coils (i.e. a current controlled system) to dampen the proof mass as well as measuring proof mass acceleration. Higher current systems generate additional electromagnetic fields that can interact with the proof mass's magnetic field, affect the output signal and skew acceleration measurements. Finally, Trostler neither teaches nor suggests a passive system, i.e. one that dampens the proof mass and produces acceleration data without the introduction of an external electrical signal Scarborough, et al U.S. Pat. No. 3,863,508 discusses dampening a proof mass with the eddy currents of a magnetic field of constant intensity. Scarborough induces the eddy currents that dampen the proof mass by use of a permanent magnet. As opposed to Scarborough, the instant invention relies solely on the interaction between the proof mass and the aluminum housing to produce eddy currents that bring the proof mass to rest; therefore, as opposed to Scarborough, the instant invention is passive and does not actively interfere with the oscillations of the proof mass. Further, unlike Scarborough, the instant invention does not introduce external voltage (or magnetic fields) to the system to produce dampening eddy currents.

The instant invention's data collection techniques are also distinguishable over Scarborough. In the instant invention, a direct measurement of the displacement as a function of time of the proof mass, via the pickup coils, produces a square inverse output which is transformed to digital form and then processed into linear data representing the acceleration of the proof mass. There is no suggestion in Scarborough that linearizing non-linear acceleration data is possible.

As further opposed to the prior art, the instant invention creates linearity in an output from a software transform, i.e., the instant invention neither requires, desires, nor attempts to achieve linearity out of the magnetic, mechanical portion of the accelerometer. The instant invention depends on software modeling of the non-linearity of the output of the magnetic, mechanical portion of the accelerometer to create an inverse function which is utilized to linearize the accelerometer's output as a function of magnetic proof mass displacement along the center axis of the sensor housing. A substantial advance in the operating range and sensitivity of the accelerometer results.

The earlier invention from which the instant invention is a Continuation-In-Part, Schendel 08/523,655, disclosed a low noise extended dynamic range accelerometer useful for sensitive seismic observations. Schendel 08/523,655 utilizes two fixed end magnets disposed at each of the ends of the sensor housing to non-linearly oppose movement of the magnetic proof mass to obtain extended range; Schendel 08/523,655 also utilizes the same two fixed end magnets as gravitational offset sources.

The instant invention improves Schendel 08/523,655 by replacing Schendel 08/523,655's two fixed end magnets with a single opposing magnetic field means externally mounted about the circumference of the sensor housing which contains the magnetic proof mass; a single externally positioned bias magnetic field means may also be used for situations when the instant invention is to be placed in a more-or-less vertical position to provide a gravitational offset source. The instant invention's single opposing magnetic field replaces Schendel 08/523,655's two fixed end magnets and generates the desired non-linear transfer characteristics by resisting movement of the magnetic proof mass as the magnetic fields of the magnetic proof mass and the single opposing magnetic field means become unbalanced. In the preferred embodiment, the opposing magnetic field means is a permanent ring magnet mounted externally about the sensor housing's circumference. An electromagnet may also be used to provide the opposing magnetic field means. The instant invention's single opposing magnetic field means further lessens the introduction of magnetic and electrical noise into the invention's operation.

The instant invention teaches an optional single bias magnetic field means located apart from the magnetic proof mass to produce the desired gravitational offset source also produced by Schendel 08/523,655's two fixed end magnets. For circumstances when the instant invention is to be positioned in a more-or-less vertical position whereby gravitational forces would tend to force the proof mass to one of the sensor housing's ends, the instant invention's optional single bias magnetic field means operates by having one of its poles aligned in opposition to the nearest magnetic pole of the magnetic proof mass. The bias magnetic field means improvement of the instant invention provides a more effective constant force in opposition to gravitational forces than the two external fixed end magnets taught by Schendel 08/523,655. For these situations, the preferred embodiment for the bias magnetic field means is a permanent bar magnet positioned externally to the sensor housing and situated more-or-less in line with the moving magnetic proof mass in such a manner as to oppose gravitational forces acting on the proof mass. Alternatively, a similarly situated electromagnet can be used to provide the bias magnetic field means.

The magnetic proof mass in the preferred embodiment is a permanent magnet, although other embodiments might use a permeable material with an induced field.

In summary, all known accelerometers, including Trostler, function by trying to achieve linearity out of the magneto-mechanical portion of the accelerometer. Such linearity is achieved, to greater and lesser extents, in other known accelerometers by a reduced range of motion, charge field feedback, or magnetic field feedback to the positioning or motion of the proof mass. External magnets disposed at the ends of the sensor housing are, in the known existing art, used to control range of motion of the magnetic proof mass. The improvement which is the instant invention does not use external magnets disposed at the ends of the sensor housing, but uses instead a single opposing magnetic field means disposed about the center of the sensor housing to create known non-linearities in the relationship between the magnetic proof mass displacement and the electrical output of the sensor coils as well as a single bias magnetic field means disposed apart from the sensor housing at an end of the sensor housing to compensate for and offset gravitational forces acting on the proof mass.

A substantial need exists for apparatus and methods of measuring accelerations which do not introduce noise, either mechanical or electrical, in their proof mass positioning detection means.

A further need exists for apparatus and methods of measuring accelerations which are capable of measuring acceleration over a very wide range of values.

Accordingly, it is a primary object of this invention to provide an improved apparatus and method of measuring accelerations over a very wide range of values which does not introduce noise, either mechanical or electrical, in its proof mass position detecting means and which has an improved means for generating non-linear transfer characteristics using an opposing magnetic field means and which further uses a bias magnetic field means to provide a more effective offset source for gravitational forces operating on the proof mass.

DESCRIPTION OF THE PREFERRED EMBODIMENT

Figure 1:
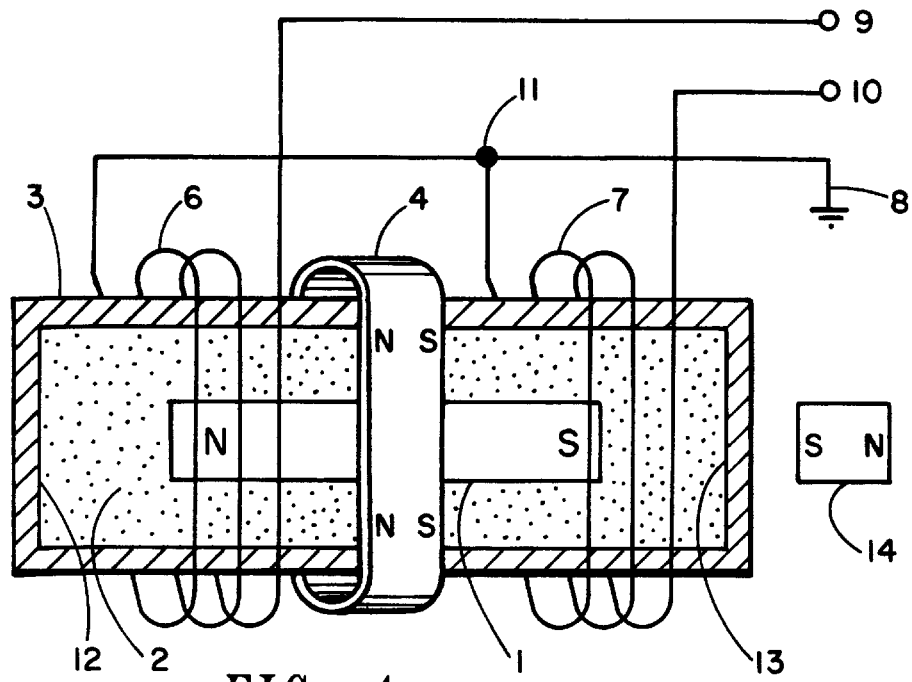
FIG. 1 is a sectional view of the apparatus of the instant invention with a schematic representation of the pickup coils, block diagrammatic representations of the opposing magnetic fields and the bias magnetic field, and a perspective view of a ring magnet all superimposed on the sectional view.
Figure 2:
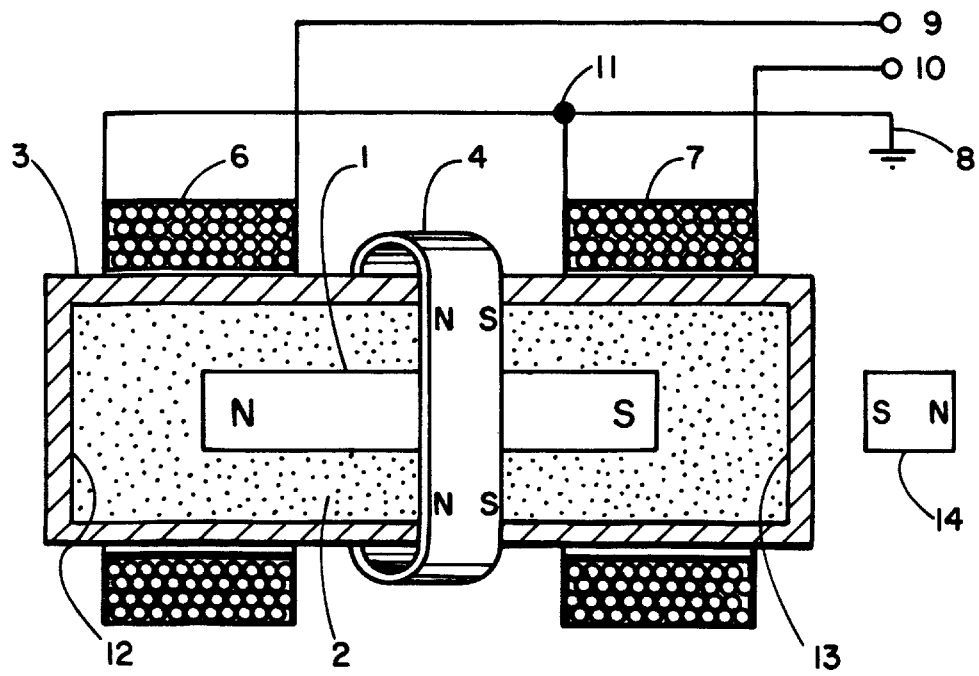
FIG. 2 is a sectional view of the apparatus of the instant invention and of the pickup coils, with a schematic representation of the pickup coil electrical connections, block diagrammatic representations of the opposing magnetic fields and the bias magnetic field, and a perspective view of a ring magnet all superimposed on the sectional view.

As seen in FIGS. 1 and 2, the instant invention comprises a magnetic proof mass (1), suspended in a ferro fluid (2) contained within a sensor housing (3), an opposing magnetic field means (4), signal pickup coils (6 and 7), and a bias magnetic field means (14) which is aligned in opposition to the magnetic field of the magnetic proof mass (1).

The magnetic proof mass (1) in the preferred embodiment is a permanent magnet, although other embodiments might use a permeable material with an induced field.

In the preferred embodiment, the opposing magnetic field means (4) is a permanent ring magnet fixed externally about the circumference of the sensor housing (3). Although the opposing magnetic field means (4) may be a ring magnet as shown in FIGS. 1 and 2, the opposing magnetic field means (4) may also be one or more permanent bar magnets, ring magnets, electromagnets, or other magnetic field generating means located externally to or fixed directly onto the sensor housing (3) and aligned such that the magnetic field of the opposing magnetic field means (4) is aligned in parallel to the magnetic field of the magnetic proof mass (1).

Similarly, in the preferred embodiment, the bias magnetic field means (14) is an externally positioned permanent bar magnet, shown as present at one end (13) of the sensor housing (3), aligned with its magnetic fields opposing those of the proof mass (1); however, the bias magnetic field means (14) can be positioned at either end (12 or 13) of the sensor housing (3) as long as its magnetic poles are aligned in opposition to the magnetic pole of the magnetic proof mass (1). Although the bias magnetic field means (14) may be a bar magnet located externally to the sensor housing (3), it may also be another means such as an electromagnet, as long as the magnetic poles of the bias magnetic field means (14) are aligned along the central axis of the sensor housing (3) in opposition to the magnetic field of the proof mass (1). The strength of the field generated by the bias magnetic field means (14) which is related to the distance between the bias magnetic field means (14) and the proof mass (1) combine to generate a constant, predictable gravitational effect offset source.

The ferro fluid (2) of the preferred embodiment is a commonly available fluid with colloidally suspended ferrite particles which align themselves with the magnetic fields (1 and 4). The magnetic field set up between the opposing magnetic field means (4) and the internal magnetic field created by the magnetic proof mass (1) aligns the ferrite particles within the ferro fluid (2) and creates magnetic lines of force which position the proof mass (1) in the center of the sensor housing (3). Further, the opposing magnetic field means (4) resists the movement of the proof mass (1) within the sensor housing (3), creating non-linear transfer characteristics when the proof mass magnetic field (1) and opposing magnetic field means (4) become unbalanced.

The sensor housing (3) in the preferred embodiment is comprised of an aluminum cylinder. While another embodiment might not have a cylindrical shape, all embodiments would have a sensor housing (3) made of aluminum. The aluminum sets up eddy currents in the internal surfaces of the sensor housing (3) which provide further opposition to the movement of the proof mass (1) and thus acts to dampen such movement. This dampening action substantially limits ringing or oscillation which would be encountered due to the natural motion of the proof mass (1) when forced by an acceleration of the proof mass (1) toward the opposing magnetic field means (4).

Pickup coils (6 and 7) may comprise two halves of a single wound coil or two separate like-wound coils as in FIGS. 1 and 2. In either event, the pickup coils (6 and 7) are like wound so that any noise generated from an external source will develop identical voltages across each of the pickup coils (6 and 7). The left-hand end of pickup coil (6) and the left-hand end of pickup coil (7) are electrically connected (11) together and to ground (8). The output (9) of pickup coil (6) and the output (10) of pickup coil (7) are the differential inputs to the input amplifier (16) shown on FIG. 3. The identical voltages developed across the pickup coils (6 and 7) by external noise will cancel at the input to the input amplifier (16).

Figure 3:
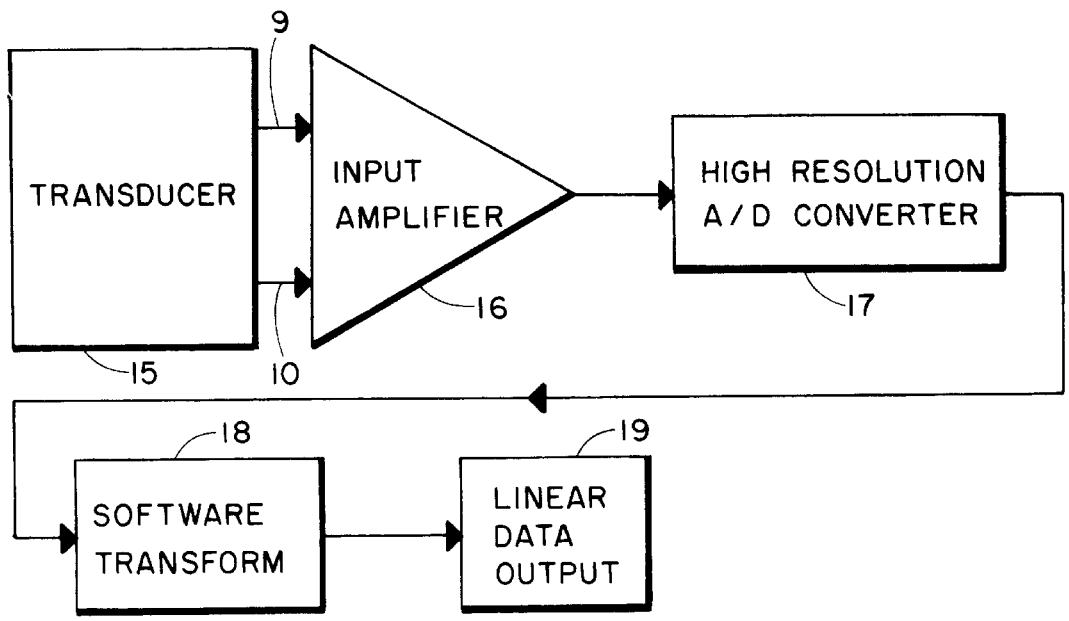
FIG. 3 is a block diagram of the electrical/electronic circuits portion of the apparatus.

The transducer (15) depicted in FIG. 3 comprises, in the preferred embodiment, the pickup coils (6 and 7). However, certain pre-amplification, pulse-shaping, and isolation may be inserted in the transducer (15) without departing from the instant invention. The outputs of the transducer (15) are, in the case of noise, of equal amplitude and of the same phase, and in the case of signal generated by movement of the proof mass (1) within the sensor housing (3) of equal amplitude and of opposite phase.

As seen in FIG. 3, the outputs (9 and 10) of the transducer (15) are input to the differential inputs of the input amplifier (16) and the output of the input amplifier (16) is input to a high resolution analog to digital (A/D) converter (17). The digital output of the high resolution analog to digital (A/D) converter (17) is then input to a computer and there subjected to a software transform (18). The output of the software transform (18) is then the linear data output (19) which is a number or other digital representation corresponding to the displacement of the proof mass (1) within the sensor housing (3).

In operation, the sensor housing (3), with its associated bias magnetic field means (14), opposing magnetic field means (4), and pickup coils (6 and 7), are attached to the body whose acceleration is to be measured. The proof mass (1) is a body at rest which tends to remain at rest; the bias magnetic field means (14) provides a constant office source to counteract gravitational forces acting on the proof mass.

The magnitude of the acceleration between the proof mass (1) and the sensor housing (3) is represented by the differential between the voltages at the outputs (9 and 10) of the pickup coils (6 and 7). The differential between the voltages at the outputs (9 and 10) will not, in general be a linear function of the magnitude of the acceleration, but must, rather, be plotted for various known values of acceleration.

Figure 4:
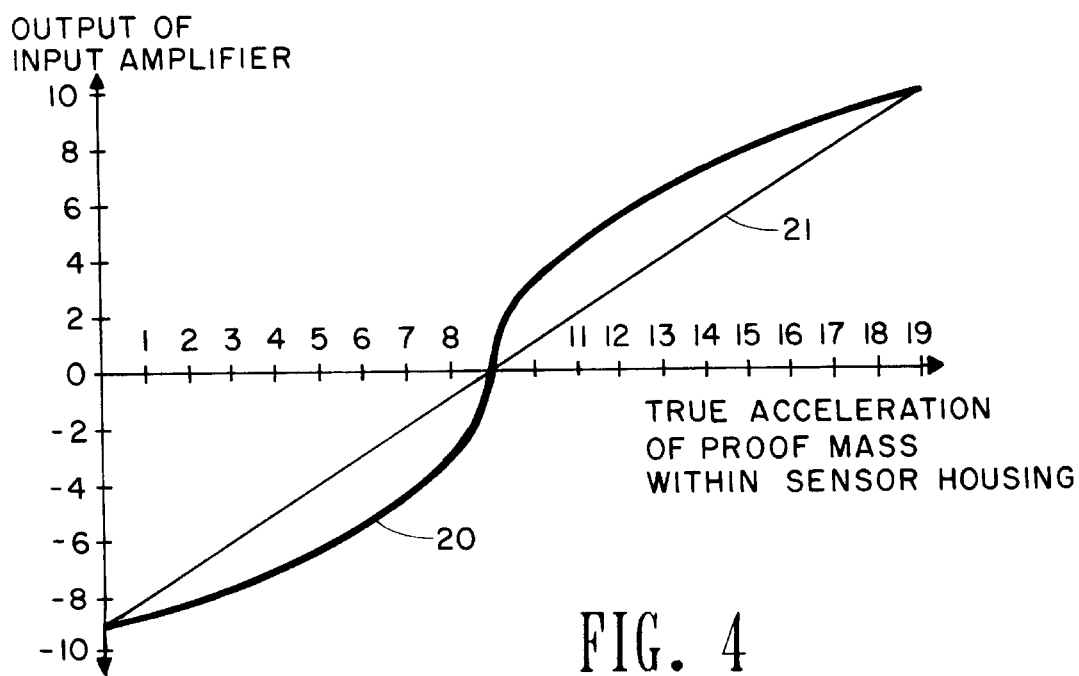
FIG. 4 is a graphical representation of an exemplar function output from the transducer portion of the apparatus superimposed upon a graphical representation of the data output of the apparatus.

As indicated in FIG. 4, the output of the input amplifier (16) may be represented on an x-y axis where the y axis is amplitude of the output of the input amplifier (16) and the x axis is the true acceleration. The waveform (20) in FIG. 4 represents the arbitrary non-linear relationship between the acceleration of the proof mass (1) within the sensor housing (3), as indicated by the output of the input amplifier (16), of the instant invention and the actual acceleration that the sensor housing (3) is being subjected to. Line (21) is the idealize actual relationship between the acceleration that the sensor housing (3) is being subjected to and the amplitude of the output of the input amplifier (16), a relationship that is realized by the output of the software transform (18) of the instant invention. The arbitrary non-linear relationship is represented by waveform (20) which must be measured and determined for a given unit of the preferred embodiment, as such function is utilized by the software transform (18) to provide a linear data output (19). The non-linearity of the waveform (20) is what permits and provides the wide range of the instant invention.

A second embodiment of the instant invention is disclosed in FIG. 3. A common problem encountered in use of the instant invention is the offset of the proof mass (1) from the center of the sensor housing (3) toward the center of the earth when the instant invention is aligned for use in a plane whereby the center line of the sensor housing (3) is perpendicular to the earth's surface. Such an offset of the proof mass (1) from the center of the sensor housing (3) produces opposite, but not equal outputs from the pickup coil (6) output (9) and the pickup coil (7) output (10). These unequal outputs create a new, additional, source of nonlinearity which can be compensated for with a bias magnetic field means (14) which is located at an end (12 or 13) of the sensor housing (3) and is aligned to oppose the force of gravity pulling the proof mass (1) toward the end (12 or 13) of the sensor housing (3) closest to the earth. The effects of gravity may also be compensated for by modifying the strength and/or position of the bias magnetic field means (14) relative to the proof mass (1). The bias magnetic field means (14) is produced in the preferred embodiment by a permanent magnet, but may without departing from the instant invention be produced by an electromagnet.

Note that the instant invention has deliberately avoided introducing external electrical signals into the sensor body (3) or external electrical signals which interact with the signal pickup coils (6 and 7). The instant invention has, however, deliberately permitted the introduction of non-linearity into the output of the signal pickup coils (6 and 7) relative to the proof mass (1) velocity at various positions along the central axis of the sensor body (3).

This invention and its operation have been described in terms of a single preferred embodiment; however, numerous embodiments are possible without departing from the essential characteristics thereof. Accordingly, the description has been illustrative and not restrictive as the scope of the invention is defined by the appended claims, not by the description preceding them, and all changes and modifications that fall within the stated claims or form their functional equivalents are intended to be embraced by the claims.

I claim:

1. An accelerometer comprising:
   a magnetic proof mass,
   an aluminum sensor housing having a center axis,
   a ferro fluid contained within said aluminum sensor housing,
   an opposing magnetic field means, and
   two signal pickup coils;
   wherein
   said opposing magnetic field means is disposed along said aluminum sensor housing and provides a magnetic field aligned in opposition to said magnetic proof mass' magnetic field,
   said magnetic proof mass is suspended within said aluminum sensor housing by the magnetic force fields created between said magnetic proof mass' magnetic field and said ferro fluid,
   said two signal pickup coils are disposed externally to said aluminum sensor housing such that said magnetic proof mass moves as a function of time along said center axis thereby producing an electrical signal across each of said two signal pickup coils, and
   said two signal pickup coils are electronically connected such that said movement produces an output electrical signal from each of said two signal pickup coils which is of opposing polarity to the output of the other of said two signal pickup coils;
   whereby
   eddy currents, generated by said movement creates magnetic fields which oppose said movement, and
   the amplitude of the differential voltage between said output electrical signals bears a nonlinear relationship to the acceleration of said magnetic proof mass relative to said aluminum sensor housing.

2. The accelerometer of claim 1 additionally comprising an input amplifier,
   an analog to digital converter, and
   a means for software transformation;
   wherein
   said differential voltage is input to said input amplifier,
   whereby
   said input amplifier serves to amplify said differential voltage.
   said analog to digital converter output represents the magnitude of said differential voltage, and
   said means for software transformation serves to convert said output of said analog to digital converter to digital data bearing a linear relationship to the acceleration of said magnetic proof mass within said aluminum sensor housing.

3. The accelerometer of claim 1 wherein said ferro fluid substantially fills said aluminum sensor housing.

4. The accelerometer of claim 2 wherein said ferro fluid substantially fills said aluminum sensor housing.

5. The accelerometer of claim 1 wherein no electrical signals external to said aluminum sensor housing are input into either of said two signal pickup coils.

6. The accelerometer of claim 2 wherein no electrical signals external to said aluminum sensor housing are input into either of said two signal pickup coils.

7. The accelerometer of claim 1, wherein said movement of said magnetic proof mass as a function of time is acceleration.

8. The accelerometer of claim 2, wherein said movement of said magnetic proof mass as a function of time is acceleration.

9. The accelerometer of claim 1 wherein said aluminum sensor housing is cylindrical.

10. The accelerometer of claim 2 wherein said aluminum sensor housing is cylindrical.

11. The accelerometer of claim 1 further comprising a bias magnetic field means disposed at one end of said aluminum sensor housing generating a bias magnetic field with said bias magnetic field aligned in opposition to the magnetic field created by said magnetic proof mass.

12. The accelerometer of claim 1 further comprising a bias magnetic field means disposed at one end of said aluminum sensor housing generating a bias magnetic field with said bias magnetic field aligned in opposition to the magnetic field created by said magnetic proof mass.

* * * * *